July 13, 1965  H. C. SWIFT  3,194,351
FRICTION PAD RETAINING MEANS FOR SPOT TYPE DISK BRAKES
Filed Dec. 11, 1963  3 Sheets-Sheet 3
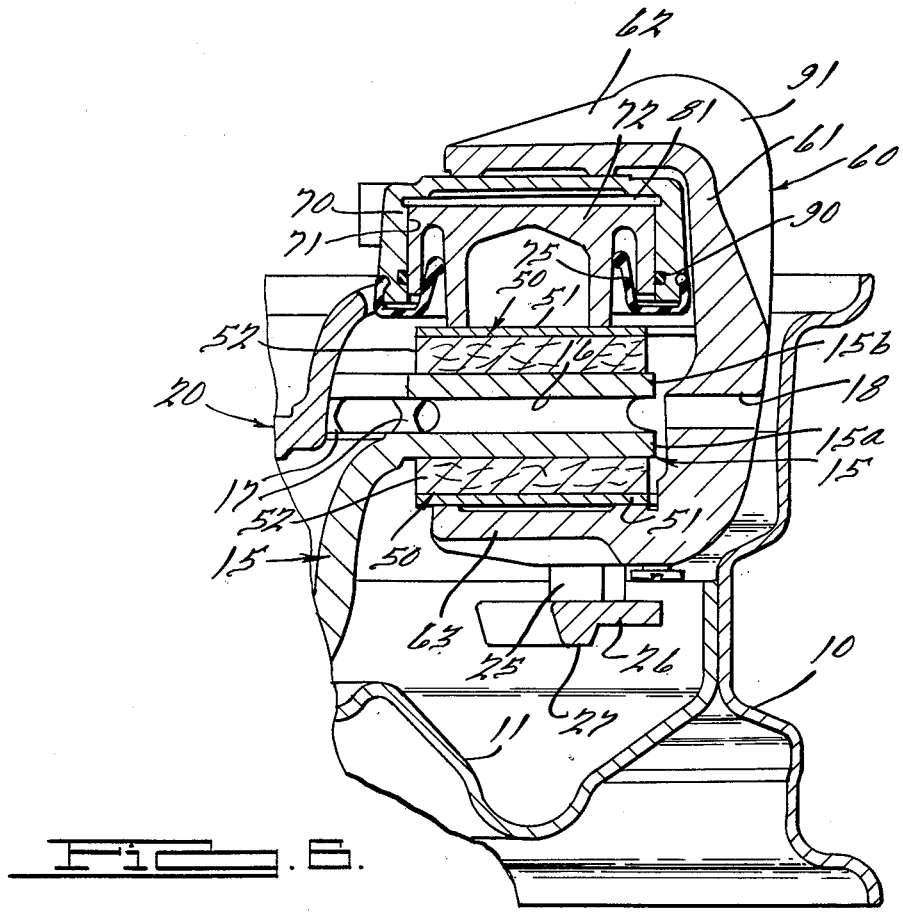
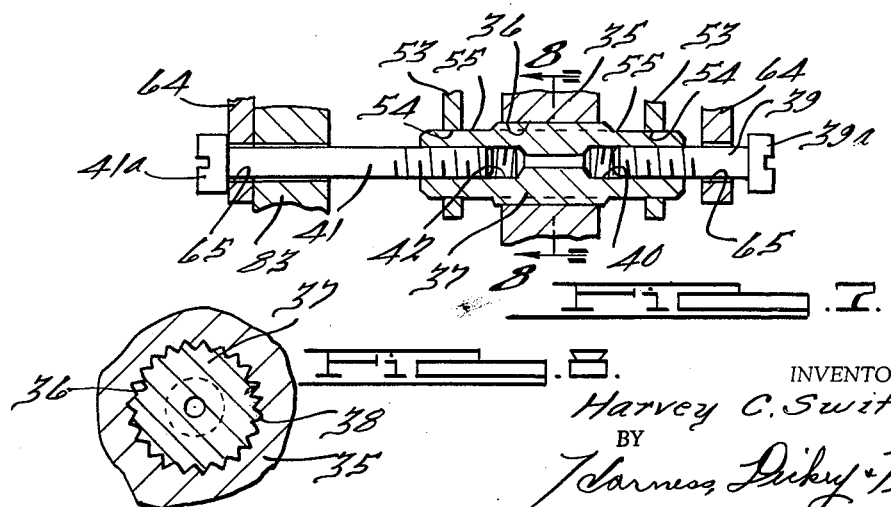
INVENTOR.
Harvey C. Swift
BY
Harness, Dickey & Pierce
ATTORNEYS

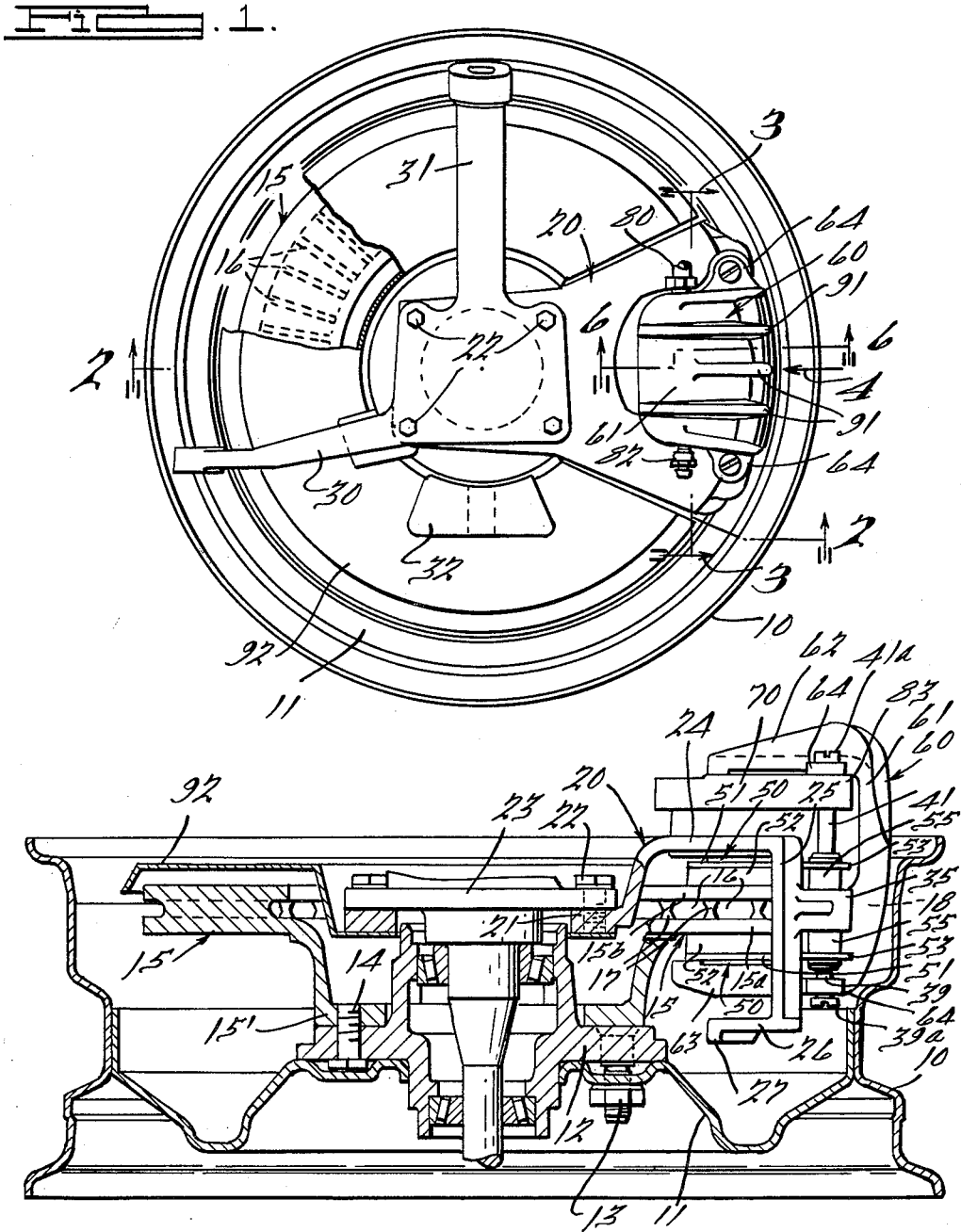

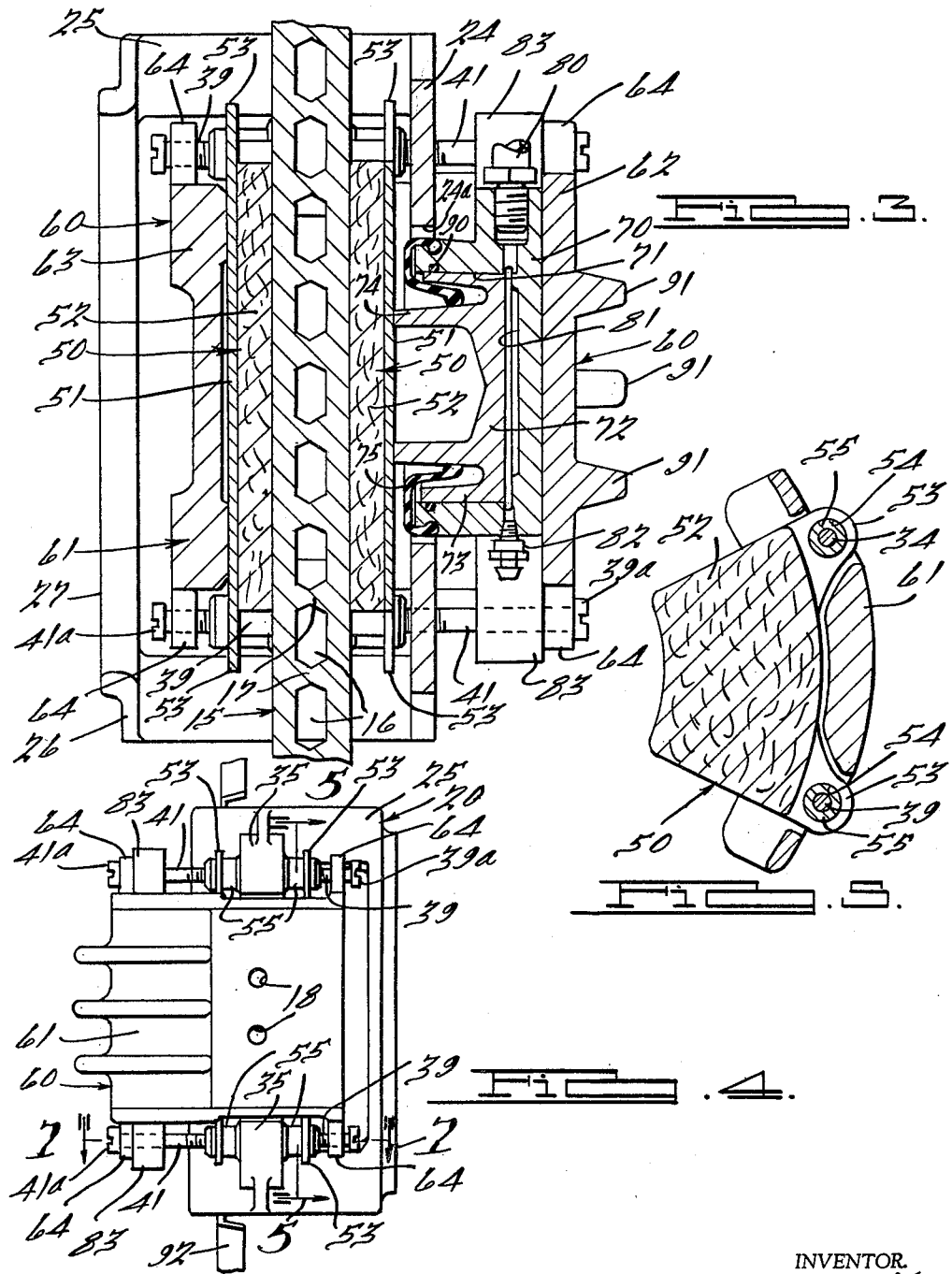

United States Patent Office 3,194,351
Patented July 13, 1965

3,194,351
FRICTION PAD RETAINING MEANS FOR SPOT TYPE DISK BRAKES
Harvey C. Swift, Birmingham, Mich., assignor to Kelsey-Hayes Company, Romulus, Mich., a corporation of Delaware
Filed Dec. 11, 1963, Ser. No. 329,756
2 Claims. (Cl. 188—73)

This invention relates to brakes and, more particularly, to improvements in disk brakes adapted to simplify, render more efficient, and improve the same generally.

In some of the prior art structures the main body or casting of the disk brake not only takes the reaction of the brake actuating pistons but also absorbs the brake torque transmitted thereto by the pistons and brake linings. Such constructions required the use of heavy castings or body portions and, because of the dual strains imposed on the body, caused a roughness in the brake operation which was objectionable. Also, in many of these prior art disk brakes, the constructions were so designed as to require the use of two and sometimes four brake actuating pistons. This increased the cost of manufacture and assembly of the brake and was otherwise objectionable.

Therefore, important objects of this invention are to provide a simplified form of disk brake which may be economically manufactured; which may be quickly and easily installed; and in which maintenance costs are reduced to a minimum.

Another important object of the invention is to provide a disk brake in which but one brake actuating piston is employed and in which the main body or casting absorbs none of the torque but merely acts as a yoke to transfer the reaction of the piston, which actuates one brake shoe, to the other brake shoe.

Another object of the invention is to provide a brake of this type in which the torque from the brake, when applied, is taken up completely by a member, in the form of a torque or anchor pin, separate from the main body or yoke, so that none of the torque is transmitted through the piston and main body or yoke, or absorbed thereby.

Still another object of the invention is to provide a disk brake wherein its structural simplicity produces a substantial economy in its manufacturing, installation and maintenance costs.

The above and other objects of the invention are attained by a construction comprising a torque member or spider secured to a stationary part of the axial housing and having one or more anchor or torque pins rigidly mounted thereon on axes parallel to the axis of the wheel. The main body or casting, in the form of a C-shaped yoke member, is slidably mounted on these torque pins for free movement longitudinally thereof to transfer the reaction of the piston, which actuates one brake shoe, to the other brake shoe. The brake shoes, in the form of lining plate assemblies or lining pucks are also freely slidably mounted on said torque pins and are movable into braking engagement with a rotor or brake disk member connected to a rotating part of the wheel axle. With such a construction, the major portion of all of the torque imposed on the brake structure, when the brake is applied, is absorbed by the torque pins and transmitted through the torque spider to the stationary part of the axle housing. Thus, the torque is not transmitted to or absorbed by the yoke or piston or lining plate assemblies (brake shoes) which move freely longitudinally of the torque pins on an axis parallel to the axis of the wheel. Each of the torque pins, two of which are usually employed, comprises a bushing rigidly secured to said spider and axially aligned bolts or pins threadedly engaging the ends of said bushing. By removing the bolts or pins the yoke may first be taken off and then the brakes shoes may be removed to facilitate the replacement or repair of the brake shoe linings. This can be accomplished without disconnecting the hydraulic system.

Inasmuch as the brake shoes float or are freely movable on the torque pins, the possibility that the linings will be knocked off or otherwise become disengaged from the backing plates is substantially eliminated. By employing only one brake actuating piston, the cost of the brake structure is reduced and the hydraulic system simplified. Also, lower cost material may be used in the piston structure because this part takes none of the torque load. Furthermore, the brake disk or rotor is formed of spaced walls having radially extending apertures or passageways therethrough, open at the inner and outer ends thereof, which serve to move cooling air in a radially outward direction between the spaced walls of the rotor to cool the same. The yoke or body casting is provided with one or more radially extending apertures to permit the cooling air to pass outwardly therethrough.

The various objects and advantages and the novel details of construction of one commercially practical embodiment of the invention, will become more apparent as this descritpion proceeds, especially when considered in connection with the accompanying drawings, in which:

FIGURE 1 is a rear elevational view of a disk brake mounted on a wheel, of a brake constructed in accordance with this invention, certain parts being broken away;

FIGURE 2 is an enlarged sectional view taken substantially on the plane indicated by line 2—2 in FIGURE 1;

FIGURE 3 is an enlarged fragmentary sectional view taken substantially on the plane indicated by line 3—3 in FIGURE 1;

FIGURE 4 is an enlarged elevational view looking in the direction of arrow 4 in FIGURE 1;

FIGURE 5 is a detail sectional view taken on line 5—5 in FIGURE 4;

FIGURE 6 is an enlarged sectional view taken substantially on the plane indicated by line 6—6 in FIGURE 1;

FIGURE 7 is a detail sectional view taken on line 7—7 in FIGURE 4; and

FIGURE 8 is a detail sectional view taken on line 8—8 in FIGURE 7.

The disk brake of this invetnion is shown as being associated with a vehicle wheel having a rim 10 and a wheel body 11 secured to an axle flange 12 by means of studs or bolt and nut assemblies 13.

Also secured to the axle flange 12 by means of studs or bolts 14 for rotation with the wheel 11 is a brake disk 15 having an attaching flange 15'. In accordance with this invention, the brake disk 15 is formed with a pair of spaced braking walls 15a and 15b. The brake disk 15 is provided with a plurality of radially extending apertures or openings 16 and the webs 17 therebetween function as fan blades and serve to move cooling air in a radially outwardly direction between the walls 15a and 15b when the brake disk is rotated. This serves to reduce the heat generated by the engagement of the brake shoes with the disk, as will be apparent. The force transmitting member or C-shaped yoke, yet to be referred to, is provided with one or more radially extending apertures 18 therethrough, in alignment with the apertures or passageways 16 to permit the cooling air to flow radially outwardly away from the brake.

The reference character 20 indicates generally a torque member or spider, which, in the form illustrated, comprises a radially inner annular flange 21 secured by bolts or the like 22 to a fixed part 23 of the axle structure. The torque member or torque arm 20 is provided with an axially offset radially extending web portion 24, a substantially semicircular outer end portion 25, and terminates in a radially inwardly extending flange 26 provided with a strengthening rib 27. The web portion 24 is formed with an opening 24a to permit passage therethrough of the brake shoe operating piston mechanism, yet to be described. As will be seen from the drawings, the torque arm 20 is rigidly attached to the fixed axle part 23, extends radially outwardly from the axle of the wheel, and is adapted to support the movable brake parts and to absorb all of the torque when the brake is applied.

If the wheel to which the brake is applied is the front steering wheel of the vehicle, it is provided with an arm 30 adapted to be connected to the steering linkage and with upper and lower arms 31 and 32 provided with aligned apertures adapted to be engaged by the king pin of the steering mechanism. However, as will be obvious, these elements form no part of the present invention.

Projecting radially outwardly from the outer end portion 25 of the torque arm 20 and spaced circumferentially of the wheel is one or more, here shown as two, anchor sleeve portions 35 (see FIGURE 4). Each sleeve member 35 is provided with a bore 36 carrying a bushing 37 which has a press fit therewith. The bushing 37 is preferably serrated (see FIGURE 8) as at 38 to engage matching portions in the bore 36 to prevent rotation of the bushing 37.

Each bushing 37 forms part of an anchor pin device for slidably supporting the brake parts yet to be described. A threaded pin or bolt 39 is adjustably received in a threaded bore 40 at one end of the bushing 37 and a threaded pin or bolt 41 is adjustably received in a threaded bore 42 at the other end of the bushing. The pin 39 is provided with a head 39a and the pin 41 is provided with a head 41a. With the structure just described, the pins or bolts 39 and 41 may be readily removed from the bushing 37 to permit the disassembly of the brake and the removal of the brake shoes (yet to be described) so that the linings thereof may be repaired or replaced.

It is important to note that the anchor pin devices just described are rigidly secured to the torque arm 20 on axes parallel to the axis of the wheel.

The brake shoe assemblies indicated generally by the reference character 50 (see FIGURES 2, 3 and 6) are in the form of lining plate assemblies or lining pucks and each comprises a backing plate 51 to which is secured a brake lining 52. Each backing plate 51 is provided with a radially outwardly extending ear or lug 53 apertured as at 54 for sliding engagement with a reduced portion 55 on the bushing 37. Thus, the brake shoes are slidable on the bushing toward and from the brake disk 15 for braking engagement therewith or release therefrom.

Also slidably mounted on the anchor pin devices is a force transmitting member indicated generally by the reference character 60. This force transmitting member consists of a substantially C-shaped yoke member 61 having spaced opposed leg portions 62 and 63. The leg portion 63 is arranged adjacent to and for direct contact with one of the brake shoes 50 while the other leg portion 62 of the yoke 61 is spaced from the other brake shoe 50 as shown in FIGURES 3 and 6. The yoke member 61 is provided with pairs of outwardly extending lugs 64 apertured as at 65 for sliding engagement with the pins 39 and 41 (see particularly FIGURE 7). Thus, the yoke member 61 is bodily slidable on the anchor pin devices and constitutes a force transmitting member adapted to take the reaction of the brake shoe actuating piston, yet to be described, and to transmit it to the opposite brake shoe in a manner yet to be described. The apertures 18 previously referred to are shown in FIGURES 4 and 6 and are in radial alignment with the openings 16 in the brake disk 15. Thus, the air flowing through the apertures 16 may escape past the yoke 61 through the apertures 18 to effectively cool the brake structure.

Arranged in abutting relation with the leg 62 of each yoke member 61 is a piston carrying member 70, preferably a casting, having a cylinder or bore 71 formed therein to slidably receive a piston 72. As shown best in FIGURES 3 and 6, the piston 72 is preferably provided with an outer skirt portion 73 which engages the cylinder 71 and with an inner annular skirt portion 74 which directly engages the adjacent brake shoe 50. A flexible annular boot 75 formed of rubber, canvas or any other suitable flexible material, may be provided to close the clearance between the cylindrical skirt portion 73 and the bore 71 to exclude therefrom dust or other foreign material.

The reference character 80 indicates a fluid inlet (FIGURE 3) by which fluid under pressure may be introduced into the space 81 behind the piston 72 to force the piston to the left, as seen in FIGURE 3, or downwardly, as seen in FIGURE 6, against the adjacent brake shoe 50 to move the same into braking engagement with the brake disk 15. The reference character 82 indicates a bleed aperture fitting for bleeding the system of air, at the outset of its operation, as is customary.

The piston carrying member 70 is provided with an ear 83 slidably engaging the pin 41 of the anchor pin device (see FIGURES 3 and 7). This slidably supports the piston carrying member 70 and piston 72 on the anchor pin device so that it may move with the yoke member 61 in the manner about to be described.

Fluid under pressure admitted through inlet conduit 80 into the space 81 behind the piston 72, which directly engages the adjacent brake shoe 50 moves this brake shoe 50 into braking engagement with the brake disk 15. The reaction of this movement of the piston 72 operates in the opposite direction to move the member 70 and the yoke member 61 through the leg 62 in the opposite direction or, in other words, to the right as viewed in FIGURE 3 or upwardly, as view in FIGURE 6. This movement of the yoke member 61 is permitted because it is slidably mounted on the anchor pin devices. This movement of the yoke member causes the leg 63 thereof to engage the other brake shoe member 50 and to move it also into braking engagement with the opposite side of the brake disk 15. Thus, both brake shoes are actuated simultaneously by the use of a single piston.

To restrict the free movement of the piston 72, an annular seal 90 is provided in the bore 71 to engage the outer skirt 73 of the piston. This seal may be an O-ring, but is preferably a seal which is rectangular in cross section and sometimes called a tetra-seal. This seal is distorted in a circular direction when the fluid pressure to the cylinder is released so that the piston may back away slightly from the adjacent brake shoe 50.

The yoke member 61 may be provided with strengthening ribs 91 as shown. The reference character 92 indicates a dust guard secured in any suitable manner to the fixed axle part 23.

The operation of the device will, it is believed, be readily understood from the foregoing description. When fluid under pressure is admitted through inlet 80 into the space 81 behind the piston 72, the piston is moved to the left, as viewed in FIGURE 3, or downwardly, as viewed in FIGURE 6, and, inasmuch as it directly engages the adjacent brake shoe 50, it will move this brake shoe into engagement with the brake disk 15. The reaction to the pressure exerted on the piston 72 is exerted against the piston carrying member 70 and through this member to the adjacent leg 62 of the yoke member 61. The brake carrying member 70 is slidably mounted on the pin 41 of the anchor pin devices by the ears 83 and hence this member 70 moves in an opposite direction to the piston and through the leg 62 of the yoke 61 moves the yoke 61 to the right, as viewed in FIGURE 3, or upwardly, as viewed in FIGURE 6. This causes the other leg 63 of the yoke member 61 to engage the opposite brake shoe 50 and to move this shoe also into braking engagement with the brake disk. Thus, it is possible to simultaneously apply both brake shoes against the brake disk by the actuation of the single piston 72, the yoke member 61 acting as a force transmitting member to transmit the reaction of the piston 72 to the opposite brake shoe.

When it is desired to disassemble the brake to repair or replace the lining 52 of the brake shoe, or for any other purpose, it is only necessary to back out the screws 39 and 41 from their threaded engagement with the bushing 37; whereupon, the yoke member 61 may be removed together with the piston carrying member 70 and the piston 72. Assuming that the fluid connection to the inlet 80 is flexible, which it usually is, this disassembling may be accomplished without disconnecting the hydraulic system. After disassembly of the yoke 61 and piston assembly 70–72, the brake shoes 50 may be removed to repair or replace the linings thereof, if desired.

It will be apparent from the foregoing description that the brake is of simple construction, requiring but one piston, so that it thus may be economically manufactured, quickly and easily installed and wherein maintenance costs are reduced to a minimum. The heads 39a and 41a of the members 39 and 41, when the latter are properly adjusted, limit the movement of the yoke member 61.

The construction is such that it may be made rugged to withstand the abuses usually imposed upon brake constructions. The major portion or substantially all of the torque imposed on the brake structure, when the brake is applied, is absorbed by the torque or anchor pins and transmitted through the torque arm or spider to the stationary part of the axle. Thus, this torque is not transmitted to or absorbed by the yoke or piston or brake shoes, which are permitted to move freely longitudinally of the anchor pins. Thus, the possibility of the linings becoming knocked off or otherwise disengaged from the backing plate is substantially eliminated. By employing only one brake actuating piston, the cost of the brake structure is reduced and the hydraulic system simplified. It has also been found that lower cost material may be used in the piston structure because this part takes none of the torque load.

By forming the brake disk 15 with radially extending openings 16 and the yoke member 61 with the communicating openings 18, air may be circulated through the brake disk and through the yoke member 61 to effectively cool the brake.

While one commercially practical embodiment of the invention has been described and illustrated herein somewhat in detail, it will be understood that various changes may be made as may come within the purview of the accompanying claims.

What is claimed is:

1. A disk brake for a vehicle wheel having a stationary axle part comprising, a brake disk rotatable with the wheel, a stationary torque arm secured to said axle part, circumferentially spaced elongated anchor pins rigidly secured to said torque member, each anchor pin comprising a bushing and adjustable threaded members secured to the ends of said bushing so as to be removable therefrom, brake shoe mounting portions on said bushings, a pair of brake shoes having apertured portions slidably engaging said bushings for movement toward and from opposite sides of said brake disk, a substantially C-shaped yoke member having apertured portions slidably mounted on said anchor pins for movement longitudinally thereof, one end of said yoke member being engageable with one of said brake shoes, and a brake actuating piston associated with said yoke member and engageable with the other brake shoe to move the same into braking engagement with said brake disk, the reaction of said piston moving said yoke member on said anchor pins to move the first mentioned brake shoe into braking engagement with said brake disk.

2. A disk brake for a vehicle wheel having a stationary axle part comprising, a brake disk rotatable with the wheel, a stationary torque arm secured to said axle part, circumferentially spaced elongated anchor pins rigidly secured to said torque member, each anchor pin comprising a bushing rigidly mounted on said torque arm and threaded members removably secured to said bushing member, reduced portions on said bushing for slidably supporting brake shoes, a pair of brake shoes having apertured portions slidably engaging said reduced bushing portions for movement toward and from opposite sides of said brake disk, a substantially C-shaped yoke member having apertured portions slidably mounted on said anchor pins for movement longitudinally thereof, one end of said yoke member being engageable with one of said brake shoes, and a piston member carried by said anchor pins adjacent one end of said C-shaped yoke member and engageable with the other brake shoe to move the same into braking engagement with said brake disk, the reaction of said piston moving said yoke member on said anchor pins to move the first mentioned brake shoe into braking engagement with said brake disk.

References Cited by the Examiner

UNITED STATES PATENTS

| | | | |
|---|---|---|---|
| 2,655,228 | 10/53 | Eksergian | 188—152.873 |
| 2,781,106 | 2/57 | Lucien | 188—73 |
| 2,820,530 | 1/58 | Chouings et al. | 188—73 |
| 2,938,609 | 5/60 | Burnett | 188—152 |
| 2,966,964 | 1/61 | Brueder | 188—152.873 |
| 3,081,843 | 3/63 | Dotto et al. | 188—152.873 |
| 3,113,643 | 12/63 | Botterill | 188—73 |

FOREIGN PATENTS

| | | |
|---|---|---|
| 565,708 | 3/58 | Belgium. |
| 844,003 | 8/60 | Great Britain. |
| 1,146,983 | 5/57 | France. |

ARTHUR L. LA POINT, *Primary Examiner.*

EUGENE G. BOTZ, *Examiner.*